United States Patent
Yi et al.

(10) Patent No.: US 11,934,495 B2
(45) Date of Patent: Mar. 19, 2024

(54) DEVICE FOR AUTOMATICALLY IDENTIFYING ANTI-ANALYSIS TECHNIQUES BY USING SIGNATURE EXTRACTION AND METHOD THEREFOR

(71) Applicant: FOUNDATION OF SOONGSIL UNIVERSITY-INDUSTRY COOPERATION, Seoul (KR)

(72) Inventors: Jeong Hyun Yi, Seongnam-si (KR); Min Koo Kang, Seoul (KR)

(73) Assignee: FOUNDATION OF SOONGSIL UNIVERSITY-INDUSTRY COOPERATION, Seoul (KR)

( * ) Notice: Subject to any disclaimer, the term of this patent is extended or adjusted under 35 U.S.C. 154(b) by 562 days.

(21) Appl. No.: 17/262,745

(22) PCT Filed: Nov. 26, 2018

(86) PCT No.: PCT/KR2018/014602
§ 371 (c)(1),
(2) Date: Jan. 25, 2021

(87) PCT Pub. No.: WO2020/050455
PCT Pub. Date: Mar. 12, 2020

(65) Prior Publication Data
US 2021/0141875 A1    May 13, 2021

(30) Foreign Application Priority Data
Sep. 5, 2018    (KR) .................. 10-2018-0105835

(51) Int. Cl.
*G06F 21/14* (2013.01)
*G06F 8/41* (2018.01)
(Continued)

(52) U.S. Cl.
CPC ............. *G06F 21/14* (2013.01); *G06F 8/427* (2013.01); *G06F 8/75* (2013.01); *G06F 16/90344* (2019.01); *G06F 21/64* (2013.01)

(58) Field of Classification Search
CPC ...... G06F 21/566; G06F 21/563; G06F 21/56; G06F 21/562; G06F 21/14;
(Continued)

(56) References Cited

U.S. PATENT DOCUMENTS 10,372,905 B1 * 8/2019 McClintock .......... G06F 21/566
10,785,255 B1 * 9/2020 Otvagin ................ H04L 63/145
(Continued)

FOREIGN PATENT DOCUMENTS

KR    10-1093410 B1    12/2011
KR    10-2014-0114769 A    9/2014
(Continued)

OTHER PUBLICATIONS

Li et al., "Malicious Code Detection for Android Using Instruction Signatures," 2014 IEEE 8th International Symposium on Service Oriented System Engineering Year: 2014 | Conference Paper | Publisher: IEEE.*
(Continued)

*Primary Examiner* — Roderick Tolentino
(74) *Attorney, Agent, or Firm* — Revolution IP, PLLC

(57) ABSTRACT

A device for automatically identifying anti-analysis techniques by using the signature extraction, includes an extraction unit which extracts a DEX file and an ELF file from an application file after unpacking the application file, which is in an APK format and includes compressed execution code to be executed on Android, a detection unit which receives the acquired signature classified according to types of the signature, analytically compares the input signature with the signature stored in a database, and detects the signature used
(Continued)

in anti-analysis techniques, and a determination unit which determines according to the detected signature what anti-analysis technique is applied to the application. According to the present invention, it is possible to enable an appropriate and quick response to damages due to malicious applications by shortening the time required for analysis and automatically recognizing the application to which the anti-analysis technique is applied.

10 Claims, 4 Drawing Sheets

(51) Int. Cl.
　　*G06F 8/75*　　　(2018.01)
　　*G06F 16/903*　　(2019.01)
　　*G06F 21/64*　　　(2013.01)
(58) Field of Classification Search
　　CPC ...... G06F 16/90344; G06F 8/427; G06F 8/75; G06F 21/64; H04L 63/1416; H04L 63/145; H04L 63/1441
　　See application file for complete search history.

(56) References Cited

U.S. PATENT DOCUMENTS

| | | | |
|---|---|---|---|
| 2013/0291111 A1* | 10/2013 | Zhou | G06F 21/566 726/23 |
| 2016/0132547 A1 | 5/2016 | Hong et al. | |
| 2016/0205125 A1* | 7/2016 | Kim | H04L 63/1408 726/23 |
| 2017/0103202 A1* | 4/2017 | Kim | G06F 21/564 |
| 2017/0149830 A1* | 5/2017 | Kim | H04L 63/1425 |
| 2017/0169224 A1* | 6/2017 | Park | G06F 21/566 |
| 2017/0262656 A1 | 9/2017 | Salmon-Legagneur et al. | |
| 2018/0025157 A1* | 1/2018 | Titonis | H04W 12/128 726/22 |
| 2018/0068115 A1* | 3/2018 | Golovkin | G06F 21/566 |
| 2019/0005239 A1* | 1/2019 | Park | G06F 21/563 |

FOREIGN PATENT DOCUMENTS

| | | |
|---|---|---|
| KR | 10-1518420 B1 | 5/2015 |
| KR | 10-1558652 B1 | 10/2015 |
| KR | 10-1623096 B1 | 5/2016 |
| KR | 10-2016-0114037 A | 10/2016 |
| KR | 10-1724412 B1 | 4/2017 |
| KR | 10-2017-0068814 A | 6/2017 |
| KR | 10-2017-0089859 A | 8/2017 |

OTHER PUBLICATIONS

Xue et al., "Adaptive Unpacking of Android Apps," 2017 IEEE/ACM 39th International Conference on Software Engineering (ICSE) Year: 2017 | Conference Paper | Publisher: IEEE.*
International Search Report for PCT/KR2018/014602 dated May 16, 2019 from Korean Intellectual Property Office.

* cited by examiner

【FIG. 1】
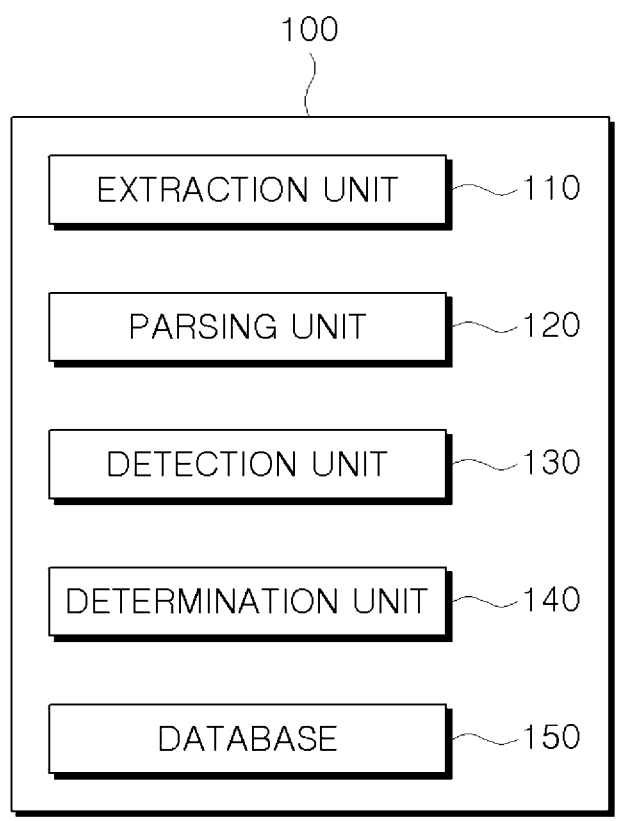

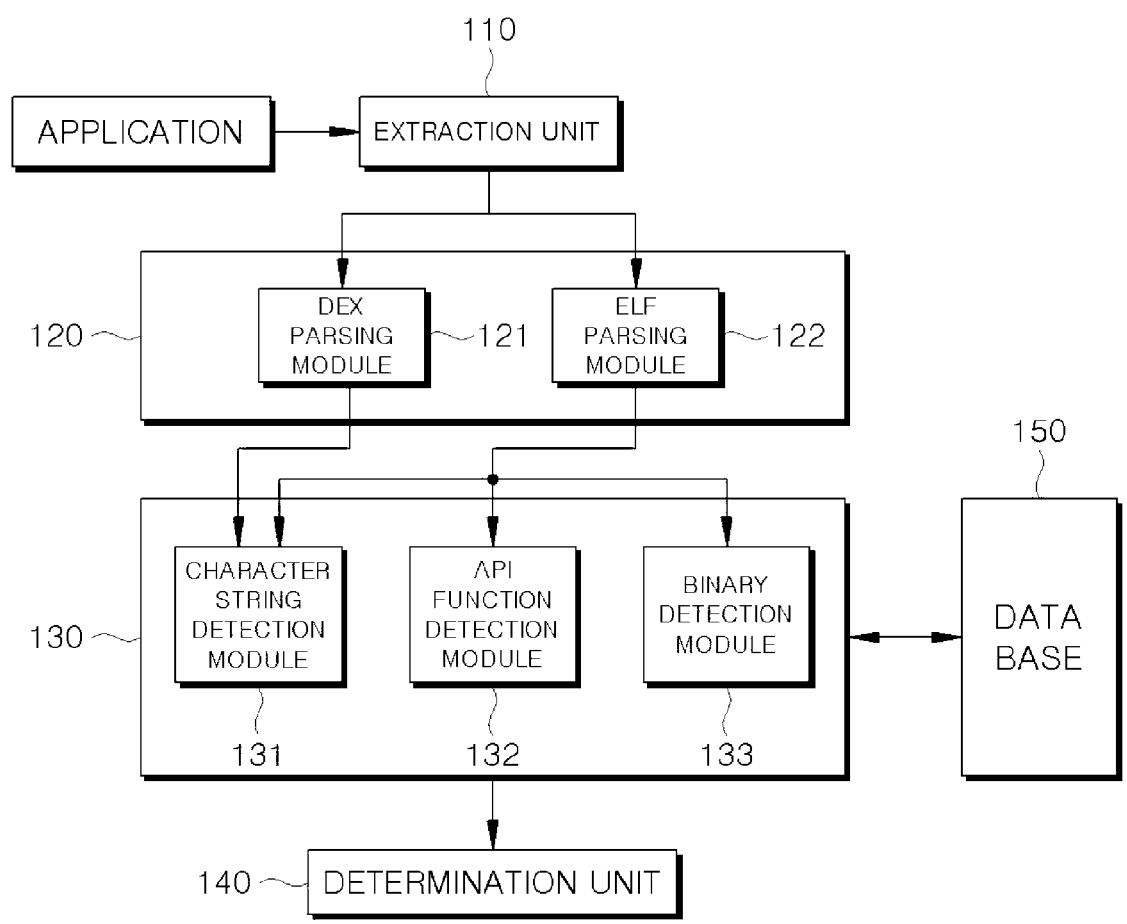
[FIG. 2]

【FIG. 3】
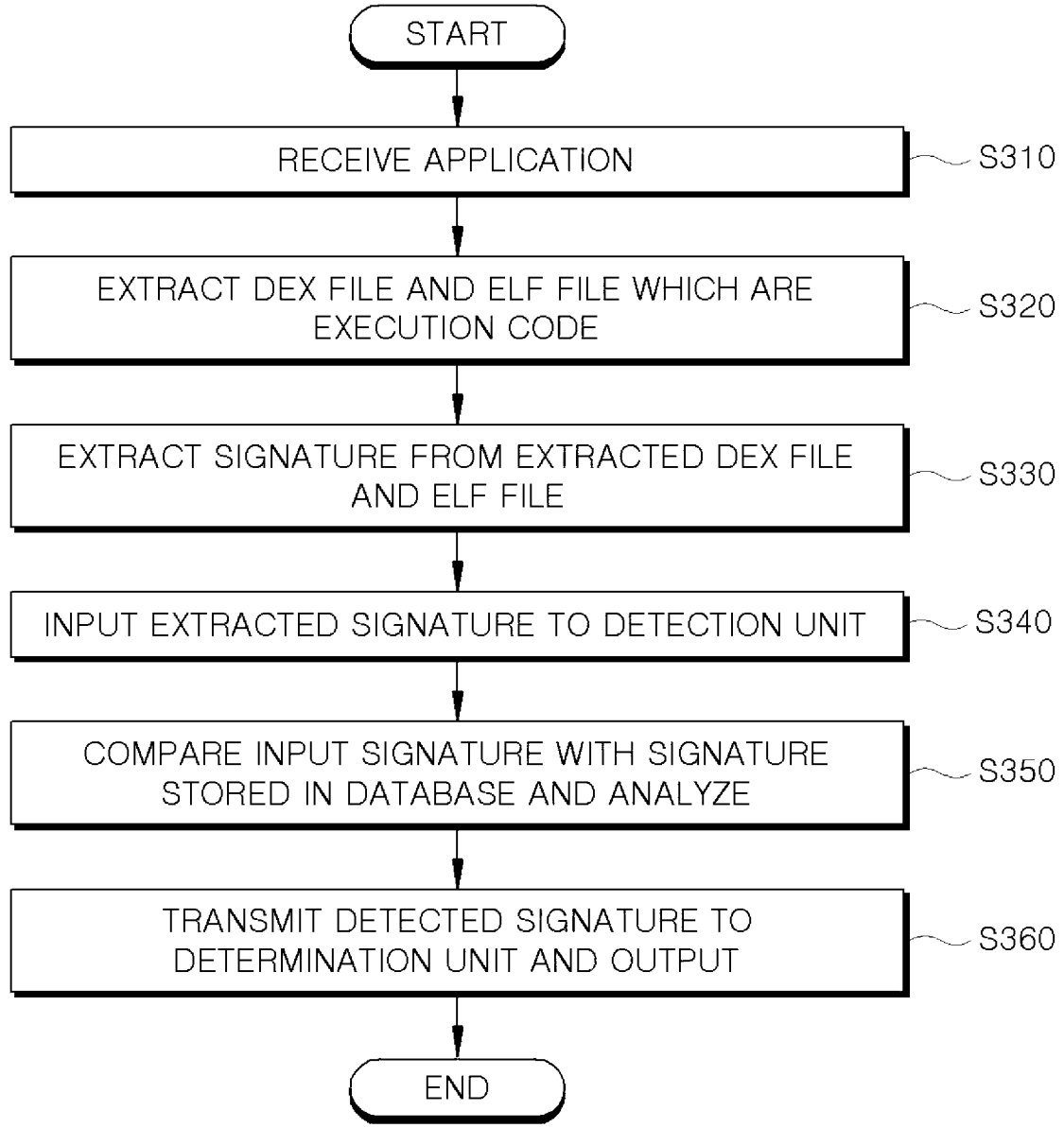

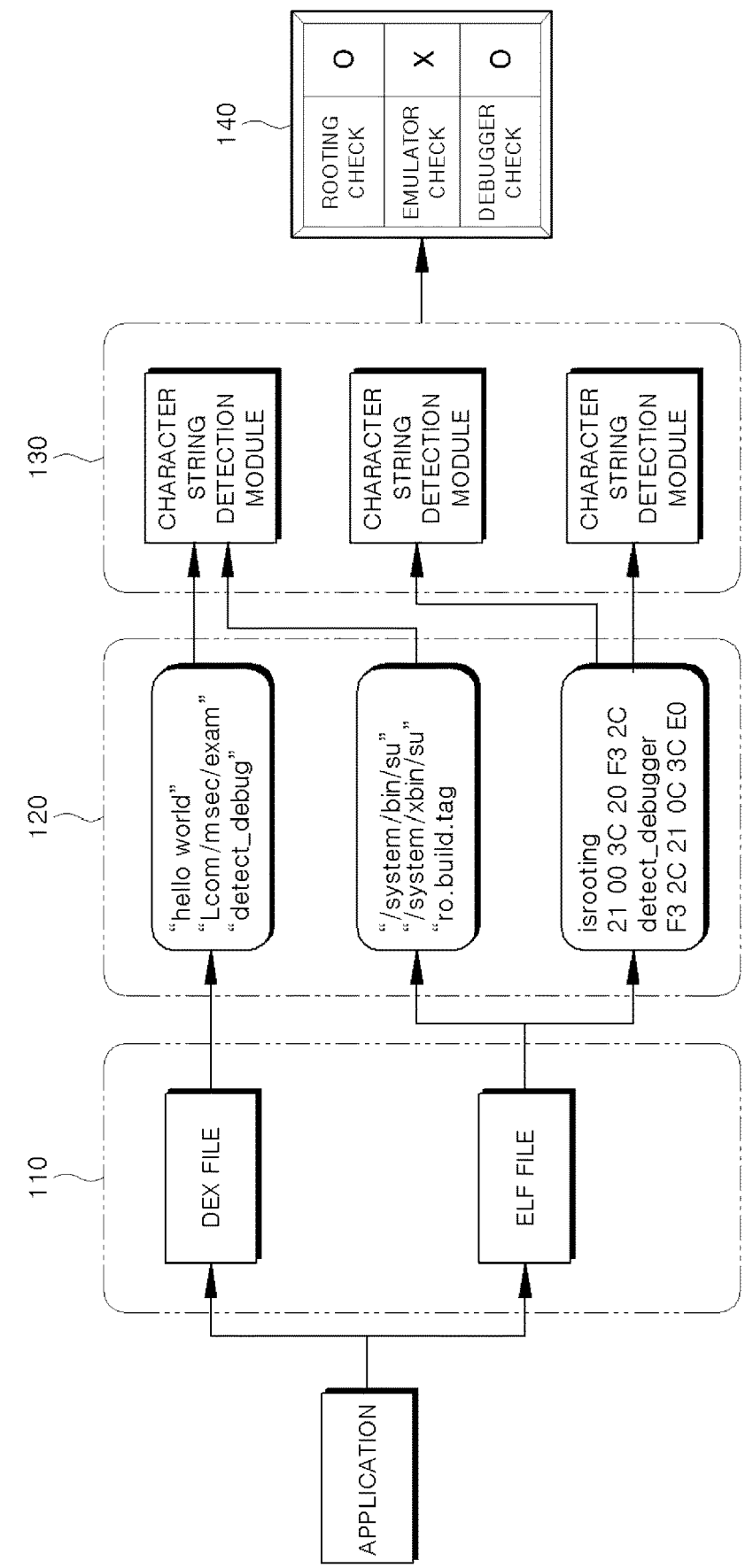
[FIG. 4]

DEVICE FOR AUTOMATICALLY IDENTIFYING ANTI-ANALYSIS TECHNIQUES BY USING SIGNATURE EXTRACTION AND METHOD THEREFOR

TECHNICAL FIELD

The present invention relates to a device for automatically identifying anti-analysis techniques by using signature extraction and a method therefor, more specifically, the device for automatically identifying anti-analysis techniques by using signature extraction and the method therefor for identifying types, methods, and application tools of the anti-analysis technique in mobile environments.

BACKGROUND ART

Recently, a malicious application market has also been growing significantly along with growth of an Android application market, and anti-analysis techniques which are mobile code protection techniques are being abused for malicious applications. In order to analyze malicious applications to which the anti-analysis technique is applied, a technique for recognizing the anti-analysis technique, which is a technique that recognizes the anti-analysis technique, is required.

In the related art, the techniques for recognizing the anti-analysis techniques often focus on recognizing the anti-analysis techniques in the PC environment rather than on mobile applications. Therefore, analysis of mobile applications depends on the capabilities and know-how of analysts, and the anti-analysis techniques have to be manually recognized for many hours.

Since such a method makes it impossible to respond quickly to tens of thousands of the malicious applications per month, a technique for automatically recognizing the anti-analysis techniques in mobile environments is required rather than a conventional method that relies on the analyst's capabilities and know-how.

An anti-routing technique, an anti-debugging technique, and an anti-emulator technique largely are representatives of the anti-analysis techniques in the mobile environments. In the related art, the technique for recognizing the anti-analysis technique is a technique for recognizing which anti-analysis techniques are applied thereto in PC environments. However, this recognition technique has a problem that it is possible to recognize the types of the anti-analysis techniques in the PC environments, but the technique cannot be used for the anti-analysis techniques in the mobile environments.

Accordingly, since the analyst has to manually analyze and recognize an application in order to recognize the anti-analysis techniques in the mobile environments, there is a problem that the analysis takes a very long time such that the response to damage due to malicious applications is not done at the right time.

Since software to which the anti-analysis techniques are applied does not operate normally in an environment for analysis, there is very little information which can be obtained compared to general software, and therefore, a technique to recognize and cope with the anti-analysis techniques is required.

The technique of the background of the present invention is disclosed in Korean Patent Application Publication No. 10-2016-0114037 (published on Oct. 4, 2016).

DISCLOSURE

Technical Problem

An object of the present invention is to provide a device for automatically identifying anti-analysis techniques by using signature extraction and a method therefor to recognize types, methods, and application tools of anti-analysis techniques in mobile environments.

Technical Solution

A device for automatically identifying anti-analysis techniques applied to an application in mobile environments according to an embodiment of the present invention to achieve this problem includes an extraction unit which extracts a DEX file and an ELF file from an application file after unpacking the application file, which is in an APK format and includes compressed execution code to be executed on Android, a parsing unit which decompiles the extracted DEX file and ELF file and parses the decompiled files to acquire a signature, a detection unit which receives the acquired signature classified according to types of the signature, analytically compares the input signature with the signature stored in a database, and detects the signature used in anti-analysis techniques, and a determination unit which determines according to the detected signature what anti-analysis technique is applied to the application.

The signature may include a character string signature, an API function signature, and a binary signature.

The parsing unit may include a DEX parsing module which extracts one or more character string signatures included in the DEX file by analyzing the extracted DEX file, and an ELF parsing module which extracts one or more character string signatures, API function signatures, and binary signatures included in the ELF file by analyzing the extracted ELF file.

The detection unit may include a character string detection module which detects a matched character string signature by receiving one or more character string signatures extracted from the DEX parsing module and the ELF parsing module, and comparing the input one or more character string signatures with the character string signature stored in the database, an API detection module which detects a matched API function signature by receiving one or more API function signatures extracted from the ELF parsing module and comparing the input one or more API function signatures with the API function signature stored in the database, and a binary detection module which detects a matched binary signature by receiving one or more binary signatures extracted from the ELF parsing module and comparing the input one or more binary signatures with the binary signature stored in the database in advance.

The database may store the character string signature, the API function signature, and the binary signature corresponding to a source code used in the anti-analysis technique.

The determination unit may determine information on a type and a tool of the anti-analysis techniques applied to the application through the detected a character string signature, an API function signature, and a binary signature, convert the determined result into a form that may be recognized by a user, and output the converted result.

The determined result may include a type, a method, and a tool of the anti-analysis technique applied to the application file, the type of the anti-analysis technique may include an anti-routing technique, an anti-debugging technique, and an anti-emulator technique, the method of the anti-analysis technique includes a character string method, an API method, and a binary method, and the tool applied to the anti-analysis technique represents a program used when creating an application in mobile environments.

A method for automatically identifying anti-analysis techniques using the device for automatically identifying anti-analysis techniques in mobile environments according to another embodiment of the present invention includes extracting a DEX file and an ELF file by receiving an application through the device for automatically identifying anti-analysis techniques, and unpacking an execution code compressed in an APK format, and included in the received application, acquiring a signature by decompiling the extracted DEX file and ELF file and parsing each of decompiled files, detecting the signature used in anti-analysis technique by receiving the acquired signature classified according to types of the signatures, and analytically comparing the input signature with the signature stored in a database, and determining the anti-analysis technique applied to the application according to the detected signature.

Advantageous Effects

According to an embodiment of the present invention, as described above, by automatically recognizing an application to which anti-analysis techniques are applied, a time required for analysis can be shortened such that it is possible to appropriately and quickly respond to a damage caused by malicious application can be made possible.

According to the present invention, when recognizing the anti-analysis technique, it is possible to recognize not only a code written in Java of Android, but also the anti-analysis technique written in a native library using JNI.

In addition, according to the present invention, it does not end with recognition itself, various information needed for analyzing an Android application such as a type of the anti-analysis technique used by the anti-analysis technique and a method used in the anti-analysis technique, is provided.

In addition, according to the present invention, by recognizing the anti-analysis technique applied to an application by using a static method rather than a dynamic method, it is possible to confirm which anti-analysis technique is applied without directly executing the application.

DESCRIPTION OF THE DRAWINGS

FIG. 1 is a block diagram illustrating a device for automatically identifying anti-analysis techniques by using signature extraction according to an embodiment of the present invention.

FIG. 2 is a diagram illustrating a structure of the device for automatically identifying anti-analysis techniques illustrated in FIG. 1.

FIG. 3 is a flowchart representing a recognition method using the device for automatically identifying anti-analysis techniques by using the signature extraction according to an embodiment of the present invention.

FIG. 4 is a diagram representing a method for automatically identifying anti-analysis techniques illustrated in FIG. 3.

BEST MODE FOR INVENTION

Hereinafter, exemplary embodiments of the present invention will be described in detail with reference to the accompanying drawings. In this process, the thickness of the lines or the size of components illustrated in the drawings may be exaggerated for clarity and convenience of description.

In addition, the terms to be described below are terms defined in consideration of functions in the present invention, which may vary according to the intention or custom of users or operators. Therefore, definitions for these terms should be made based on the contents throughout the present specification.

First, a device for automatically identifying anti-analysis techniques by using signature extraction according to an embodiment of the present invention will be described with reference to FIG. 1.

FIG. 1 is a block diagram illustrating a device for automatically identifying anti-analysis techniques by using signature extraction according to an embodiment of the present invention.

As illustrated in FIG. 1, a device 100 for automatically identifying anti-analysis techniques according to an embodiment of the present invention includes an extraction unit 110, a parsing unit 120, a detection unit 130, a determination unit 140, and a database 150.

The extraction unit 110 extracts a DEX file and an ELF file which are execution codes included in an application. However, since the DEX file and the ELF file are compressed in an APK format, the extraction unit 110 extracts the DEX file and the ELF file by unpacking the APK.

The parsing unit 120 decompiles the DEX file and the ELF file extracted in the extraction unit 110 and acquires a signature by parsing each of the decompiled files.

The signature includes a character string signature, an API signature, and a binary signature, and the acquired signature is transmitted to the detection unit 130 to determine whether or not the anti-analysis technique is applied.

The detection unit 130 receives the character string signature, the API signature, and the binary signature extracted in the parsing unit 120, and each of input signatures is compared with the signature stored in the database 150 and analyzed such that the signature used in the anti-analysis technique is detected.

The determination unit 140 determines the anti-analysis technique applied to an application by using the signature detected in the detection unit 130, and the determined result is converted into a form that can be recognized by a user, and output.

The database 150 collects and stores the signature necessarily used in an anti-routing technique, an anti-debugging technique, and an anti-emulator technique, which are representative anti-analysis techniques.

FIG. 2 is a diagram illustrating a structure of the device for automatically identifying anti-analysis techniques illustrated in FIG. 1.

As illustrated in FIG. 2, the device 100 for automatically identifying anti-analysis techniques according to an embodiment of the present invention receives an application and recognizes automatically whether or not the anti-analysis technique is applied thereto. Meanwhile, since the application received in the device 100 for automatically identifying anti-analysis techniques can recognize the anti-analysis technique regardless of whether or not it is executed, the device 100 for automatically identifying anti-analysis techniques can analyze in a static state whether or not the anti-analysis technique is applied to the application.

Accordingly, the extraction unit 110 receives an application that does not know whether or not the anti-analysis technique is applied thereto and unpacks the execution code included in the received application.

An application of Android is in a form of compressed files such as .dex and .xml into .apk (android application package).

Accordingly, the extraction unit 110 converts a compressed APK file into a ZIP extension, decompresses the converted result, and acquires a classes.dex file and a shared library file from the decompressed APK.

The extraction unit 110 extracts the DEX file and the ELF file which are Android execution codes among a plurality of acquired files.

The parsing unit 120 parses the execution code to obtain a signature required for the recognition of the anti-analysis technique from the extracted DEX file and ELF file which are the execution codes.

The DEX file and the ELF file which are the execution codes of Android include a plurality of pieces of information and the plurality of pieces of information includes APIs, functions, field values, and strings used for each source.

Accordingly, the parsing unit 120 further includes a DEX parsing module 121 and an ELF parsing module 122 to parse each of the DEX file and the ELF file.

The DEX parsing module 121 parses the DEX file, and extracts one or more strings, that is, the character string signature from the DEX file.

The ELF parsing module 122 parses the ELF file, and extracts one or more character string signatures, API function signatures, and binary signatures from the ELF file.

As described above, the signature extracted in the DEX parsing module 121 and the ELF parsing module 122 is to recognize the anti-routing technique, the anti-debugging technique, and the anti-emulator technique which are representative techniques of the anti-analysis techniques.

Accordingly, the parsing unit 120 transmits the extracted character string signature, API function signature, and binary signature to the detection unit 130, and the detection unit 130 receiving the signature detects the signature used in the anti-analysis technique by comparing with the signature stored in the database 150 and analyzing.

The detection unit 130 receives the signature from the DEX parsing module 121 and the ELF parsing module 122, and the received signature is classified according to types and transmitted to each detection module.

Accordingly, the detection unit 130 includes a character string detection module 131 receiving the character string signature, an API detection module 132 receiving the API signature, and a binary detection module 133 receiving the binary signature.

The character string detection module 131 receives one or more signatures extracted from the DEX parsing module 121 and the ELF parsing module 122, respectively, and determines the received one or more signatures and the character string signature stored in the database 150 by comparing therebetween.

At this time, when it is determined that any one of one or more character string signatures is the same as the signature stored in the database 150, the detection unit 130 detects the same character string signature, and transmits the detected result to the determination unit 140.

The API detection module 132 receives the API function signature from the ELF parsing module 122, and determines the received API function signature and the signature stored in the database 150 by comparing therebetween.

In other words, the API detection module 132 receives one or more API function signatures extracted from the ELF parsing module 122, and the API detection module 132 receiving one or more API function signatures detects the same API function signature by comparing the received signature with the API function signature stored in the database 150.

When detection of the API function signature is completed, the API detection module 132 transmits the detected API function signature to the determination unit 140.

The binary detection module 133 receives one or more binary signatures from the ELF parsing module 122, and detects the same binary signature by comparing the received one or more binary signatures with the signature stored in the database 150.

The binary signature detected in the binary detection module 133 is transmits to the determination unit 140.

The determination unit 140 receives the signature detected in the detection unit 130, converts the received signature into a form that can be recognized by a user, and outputs the converted result.

Hereinafter, with reference to FIG. 3 and FIG. 4, a method for automatically identifying anti-analysis techniques using the device for automatically identifying anti-analysis techniques in mobile environments according to an embodiment of the present invention, will be described in detail.

FIG. 3 is a flowchart representing a recognition method using the device for automatically identifying anti-analysis techniques according to an embodiment of the present invention, and FIG. 4 is a diagram representing the method for automatically identifying anti-analysis techniques illustrated in FIG. 3.

As illustrated in FIG. 3, according to an embodiment of the present invention, the extraction unit 110 included in the device 100 for automatically identifying anti-analysis techniques receives an application of determining whether the anti-analysis technique is applied (S310).

The received application may be in a state of being executed or not being executed in the mobile environments. At this time, information included in the APK is different depending on a case where the APK included in the application is executed in the mobile environments or not executed once.

The extraction unit 110 receiving the application extracts the execution code executed in Android.

At this time, since the execution code is compressed in the APK format, first, the extraction unit 110 unpacks the APK and extracts the DEX file and the ELF file (S320).

Since each of the extracted DEX file and ELF file includes a lot of pieces of information, the extraction unit 110 transmits the extracted DEX file and ELF file to the parsing unit 120 in order to extract the signatures included in the DEX file and the ELF file.

The parsing unit 120 receiving the DEX file and the ELF file classifies the received files and transmits the classified result to the DEX parsing module 121 for parsing the DEX file and the ELF parsing module 122 for parsing the ELF file, respectively.

Accordingly, the DEX parsing module 121 and the ELF parsing module 122 extract signatures by parsing the DEX file and the ELF file which are received, respectively (S330).

In other words, the DEX file received to the DEX parsing module 121 is decompiled and parsed such that one or more character string signatures are extracted.

As the extracted character string signatures illustrated in FIG. 4, a character string such as "hello world", "Lcom/msec/exam", and "detect_debug" is extracted.

The extracted character string may be meaningful or meaningless. Accordingly, the DEX parsing module 121 extracts a plurality of meaningful character strings and transmits the extracted result to the detection unit 130.

Meanwhile, the ELF parsing module 122 extracts one or more character string signatures, one or more API function signatures, and one or more binary signatures by decompiling and parsing the received ELF file.

For example, the ELF parsing module 122 extracts "/system/bin/su", "/system/xbin/su", "ro.build.tag", isrooting, 21 00 3C 20 F3 2C, detect_debugger, and F3 2C 21 0C 3C E0 by parsing the ELF file.

As described above, the signature extracted in the parsing unit 120 is transmitted to the detection unit 130, and the detection unit 130 receiving the signature classifies each of the types of the signatures and transmits the classified result to corresponding detection modules 131, 132, and 133 (S340).

That is, when the signature transmitted from the parsing unit 120 is the character string signature, the detection unit 130 inputs the character string signature to the character string detection module 131, when the signature transmitted from the parsing unit 120 is the API function signature, the detection unit 130 inputs the API function signature to the API detection module 132, and when the signature transmitted from the parsing unit 120 is the binary signature, the detection unit 130 inputs the binary signature to the binary detection module 133.

Accordingly, the character string detection module 131 receives the character string signature including "hello world", "Lcom/msec/exam", and "detect_debug" extracted in the DEX parsing module 121 and the character string signature including "/system/bin/su", "/system/xbin/su", and "ro.build.tag" extracted in the ELF parsing module 122.

In addition, the API detection module 132 receives the API function signature including isrooting and detect_debugger extracted in the ELF parsing module 122, and the binary detection module 133 receives the binary signature including 21 00 3C 20 F3 2C and F3 2C 21 0C 3C E0 extracted in the ELF parsing module 122.

As described above, the detection unit 130 receiving the signature classified according to the types analyzes the signature by comparing with the signature stored in the database 150 (S350).

Accordingly, the detection unit 130 compares input signature with the signature stored in the database, and determines whether to apply the anti-analysis technique.

In more detail this, for example, it is assumed that "detect_debug" which is the character string signature necessarily used in the anti-debugging technique is stored in the database 150. Then, the character string detection module 131 detects "detect_debug" which is the same character string signature by comparing the input character string signatures, that is, "hello world", "Lcom/msec/exam", "detect_debug", "/system/bin/su", "/system/xbin/su", and "ro.build.tag" with the character string signature stored in the database 150.

In addition, assuming that isrooting which is the API function signature necessarily used in the anti-routing technique is stored in the database 150, the API detection module 132 compares the received isrooting and detect_debugger which are the API function signatures with the API function signature stored in the database 150 and detects isrooting which is the same API function signature.

In addition, it is assumed that "21 00 3C 20 F3 2C" which is the binary signature necessarily used in the anti-emulator technique is stored in the database 150. Then, the binary detection module 133 compares the received "21 00 3C 20 F3 2C" and "F3 2C 21 0C 3C E0" which are the binary signatures with the binary signature stored in the database 150 and detects "21 00 3C 20 F3 2C" which is the same binary signature.

As described above, the signature detected in the detection unit 130 is transmitted to the determination unit 140, and the determination unit 140 receiving the detected signature converts information on the signature identified by the anti-analysis technique into a form that can be recognized by a user, and outputs the converted result (S360).

Accordingly, the determination unit 140 provides information on a type, a method, and an applied tool of the anti-analysis technique to a user through the detected signature.

For example, as described above, if the detection unit 130 detects the signature including "detect_debug", "isrooting", and "21 00 3C 20 F3 2C", the determination unit 140 outputs a result that all the anti-routing technique, the anti-debugging technique, and the anti-emulator technique are applied by using the detected signature.

Accordingly, according to an embodiment of the present invention, since an application to which the anti-analysis technique is applied is automatically identified, there is an effect that it is possible to enable an appropriate and quick response to damages due to malicious applications by shortening a time required to analyze.

In addition, according to an embodiment of the present invention, when recognizing the anti-analysis technique, it is possible to recognize not only a code written in Java, but also the anti-analysis technique written in a native library by using JNI, and it does not end with the recognition on the anti-analysis technique itself, but it is possible to provide the effect of providing various information required for analyzing an Android application, a type of the anti-analysis technique used by the anti-analysis technique, a method used in the anti-analysis technique, and the like.

In addition, according to an embodiment of the present invention, by recognizing the anti-analysis technique applied to the application by using a static method rather than a dynamic method, it is possible to check which anti-analysis technique is applied without executing the application directly.

The present invention has been described with reference to the embodiments illustrated in the drawings, but this is only exemplary, and those of ordinary skill in the art will understand that various modifications and other equivalent embodiments are possible therefrom. Therefore, the true technical protection scope of the present invention should be determined by the technical idea of the following claims.

The invention claimed is:
1. A device, comprising:
one or more processors; and one or more non-transitory computer-readable media storing computer-executable instructions that, when executed by the one or more processors, perform automatically identifying anti-analysis techniques applied to an application in mobile environments,
and further comprising:
automatically identifying anti-analysis techniques applied to an application in mobile environments, comprising:
an extraction unit which extracts a DEX file and an ELF file from an application file after unpacking the application file, which is in an APK format and includes compressed execution code to be executed on Android;
a parsing unit which decompiles the extracted DEX file and ELF file and parses the decompiled files to acquire a signature, wherein the signature includes a character string signature, an API function signature, and a binary signature;
a detection unit which receives the acquired signature classified according to types of the signature, analytically compares the input signature with the signature stored in a database, and detects the signature used in the anti-analysis technique; and
a determination unit which determines according to the detected signature what anti-analysis technique is applied to the application, wherein the detection unit includes a character string detection module, an API detection module, and a binary detection module,
wherein the character string detection module is configured to detect a matched character string signature by receiving one or more character string signatures extracted from the parsed DEX file and ELF file, and comparing the received one or more character string signatures with the character string signature stored in the database,
wherein the API detection module is configured to detect a matched API function signature by receiving one or more API function signatures extracted from the parsed ELF file, and comparing the received one or more API function signatures with the API function signature stored in the database,
wherein the binary detection module is configured to detect a matched binary signature by receiving one or more binary signatures extracted from the parsed ELF file, and comparing the received one or more binary signatures with the binary signature stored in the database in advance.

2. The device for automatically identifying anti-analysis techniques of claim 1, wherein the parsing unit includes a DEX parsing module which extracts one or more character string signatures included in the DEX file by analyzing the extracted DEX file, and
an ELF parsing module which extracts one or more character string signatures, API function signatures, and binary signatures included in the ELF file by analyzing the extracted ELF file.

3. The device for automatically identifying anti-analysis techniques of claim 1, wherein the database stores the character string signature, the API function signature, and the binary signature corresponding to a source code used in the anti-analysis technique.

4. The device for automatically identifying anti-analysis techniques of claim 1, wherein the determination unit determines information on a type and a tool of the anti-analysis techniques applied to the application through the detected character string signature, API function signature, and binary signature, converts the determined result into a form that may be recognized by a user, and outputs the converted result.

5. The device for automatically identifying anti-analysis techniques of claim 4, wherein the determined result includes a type, a method, and a tool of the anti-analysis technique applied to the application file,
the type of the anti-analysis technique includes an anti-routing technique, an anti-debugging technique, and an anti-emulator technique,
the method of the anti-analysis technique includes a character string method, an API method, and a binary method, and
the tool applied to the anti-analysis technique represents a program used when creating an application in mobile environments.

6. A method for automatically identifying anti-analysis techniques using a device for automatically identifying anti-analysis techniques in mobile environments, comprising:
extracting a DEX file and an ELF file by receiving an application through the device for automatically identifying anti-analysis techniques, and unpacking an execution code compressed in an APK format, and included in the received application;
acquiring a signature by decompiling the extracted DEX file and ELF file and parsing each of decompiled files, wherein the signature includes a character string signature, an API function signature, and a binary signature;
detecting the signature used in anti-analysis technique by receiving the acquired signature classified according to types of the signatures, and analytically comparing the input signature with the signature stored in a database; and
determining the anti-analysis technique applied to the application according to the detected signature,
wherein in detecting the signatures,
a matched character string signature is detected by receiving one or more character string signatures extracted from the parsed DEX file and ELF file, and comparing the received one or more character string signatures with the character string signature stored in the database,
a matched API function signature is detected by receiving one or more API function signatures extracted from the parsed ELF file and comparing the received one or more API function signatures with the API function signature stored in the database, and
a matched binary signature is detected by receiving one or more binary signatures extracted from the parsed ELF file and comparing the received one or more binary signatures with the binary signature stored in the database in advance.

7. The method for automatically identifying anti-analysis techniques of claim 6, wherein in the acquiring the signature, one or more character string signatures included in the DEX file are acquired by analyzing the DEX file extracted through a DEX parsing module, and
one or more character string signatures, API function signatures, and binary signatures included in the ELF file are acquired by analyzing the ELF file extracted through an ELF parsing module.

8. The method for automatically identifying anti-analysis techniques of claim 6, wherein the database stores the character string signature, the API function signature, and the binary signature corresponding to a source code used in the anti-analysis technique.

9. The method for automatically identifying anti-analysis techniques of claim 6, wherein in the determining the anti-analysis technique, information on a type and a tool of the anti-analysis techniques applied to the application through the detected character string signature, API function signature, and binary signature, is determined, the determined result into a form that may be recognized by a user, is converted, and the converted result is output.

10. The method for automatically identifying anti-analysis techniques of claim 9, wherein the determined result includes a type, a method, and a tool of the anti-analysis technique applied to the application file,
the type of the anti-analysis technique includes an anti-routing technique, an anti-debugging technique, and an anti-emulator technique, the anti-analysis technique includes a character string method, an API method, and a binary method, and the tool applied to the anti-analysis technique represents a program used when creating an application in mobile environments.

\* \* \* \* \*